April 12, 1955  J. H. MIURA ET AL  2,705,893
GEAR SHIFT MECHANISM

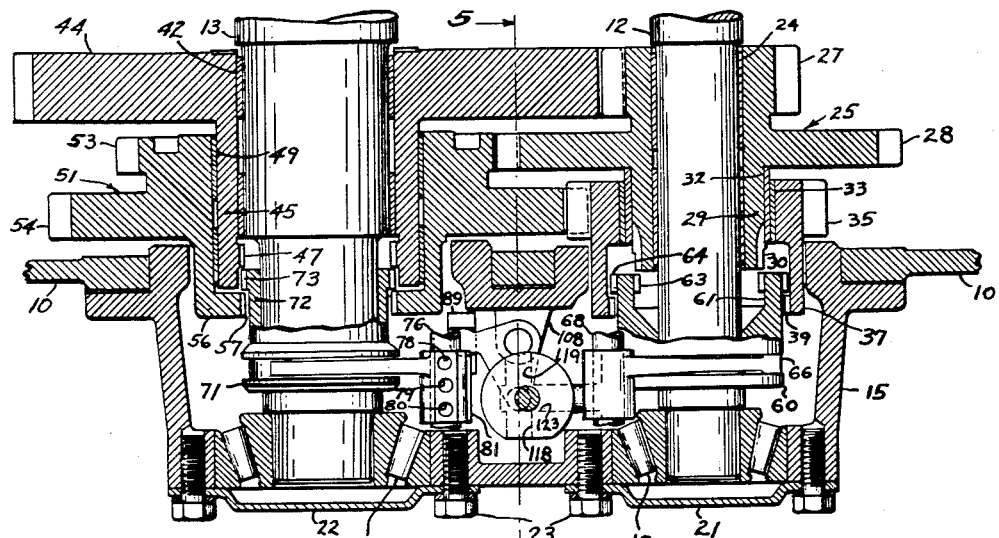

Original Filed Dec. 3, 1953  2 Sheets-Sheet 2

INVENTOR.
JOHN H. MIURA
BY JOHN ZEMELKA
James E. Nilles
ATTORNEY

United States Patent Office 2,705,893
Patented Apr. 12, 1955

2,705,893

GEAR SHIFT MECHANISM

John H. Miura and John Zemelka, Toronto, Ontario, Canada, assignors to Massey-Harris-Ferguson Limited, a corporation of Canada Original application December 3, 1953, Serial No. 395,979. Divided and this application September 13, 1954, Serial No. 455,395

3 Claims. (Cl. 74—473)

This invention relates to transmissions and gear shifting mechanism therefor.

This application is a division of our copending application Serial Number 395,979, filed December 3, 1953.

In farm tractors, where this invention finds particular utility, it is desirable to keep the overall width of the frame as narrow as possible for good visibility of the crop being worked and for accessibility to the operator's platform. It is also desirable, in some instances, to have a "cross shaft" transmission in the tractor so as to utilize all of the available space within the tractor housing in order to be able to accommodate other component parts such as hydraulic equipment.

It is an object of this invention to fulfill the above requirements.

It is an object of this invention to provide a transmission and gear shift mechanism therefor which is very compact and narrow in overall width and highly efficient for the purposes for which it is designed.

It is a more specific object of this invention to provide a transmission of the "serpentine" type which utilizes an "endwise" shift which requires no axial displacement of the gears in order to select the various speed ratios, such transmission having a simple and efficient shifting means therefor.

It is another object of this invention to provide a shifting device for such a transmission which enables the operator to "shift" two separate sets of gears independently of one another, using only a single shift lever having a conventional shifting motion. In this regard the operator automatically selects the proper speed range with the initial movement of the shift lever and the transmission remains in neutral until the second and final selection of gear ratios is made. With this device it is impossible for the operator to select the gear combination in an improper sequence.

These and other objects and advantages of this invention will appear more fully as this disclosure progresses, reference being had to the following drawings in which:

Figure 1 is a plan view, in section,, of this invention.

Figure 2 is an elevational view, in section, of the device shown in Figure 1.

Figure 3 is a plan view of the shifting pattern of the upper end of the shift lever.

Figure 4:
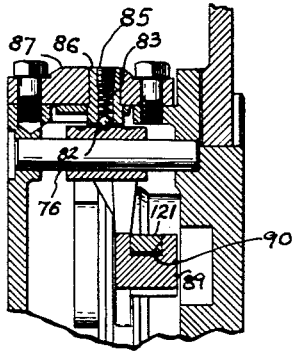
Figure 4 is an elevational view taken on line 4—4 of Figure 2.

Referring more particularly to Figure 1 of the drawings, only a portion of the tractor housing 10 is shown, this portion being the right side of the tractor; the housing 10 extending in a longitudinal direction of the tractor. Transversely mounted in the tractor housing and suitably supported at either end are the drive shaft 12 and the driven shaft 13. An outwardly extending housing 15 is secured to the main housing 10, by means of bolts 16, in which are mounted the thrust bearings 18 and 19 for supporting one end of shafts 12 and 13 respectively. Cover plates 21 and 22 are secured to the housing 15 by suitable bolts 23 and are easily removable to facilitate the assembly and disassembly of the transmission. Rotatably mounted on the first shaft 12, by means of sleeve bushings 24, is cluster gear 25 comprising a small gear element 27 and a larger gear element 28. The cluster gear 25 has a long hub portion 29 which has a clutch portion 30 on the periphery thereof. Mounted on the hub portion 29 is a steel sleeve 32 which gives a full bearing surface to the sleeve bushing 33 of gear 35 rotatably mounted thereon. Gear 35 has an annular flange 37 having an internal clutch portion 39 therein. The second, or driven shaft, 13 has rotatably mounted thereon, by means of a sleeve bushing 42, a gear 44 having a long hub portion 45 with an internal clutch portion 47 therein. Rotatably mounted on this long hub, on sleeve bushings 49, is the cluster gear 51 having a small gear element 53 and larger gear element 54. The cluster gear 51 has an annular flange 56 which extends radially inwardly at its outer end and has an internal clutch portion 57 thereon. In the transmission thus described, there is no axial displacement of the gears during shifting but instead they are in continuous mesh, the gear selection being made by means to be presently described.

Figure 5:
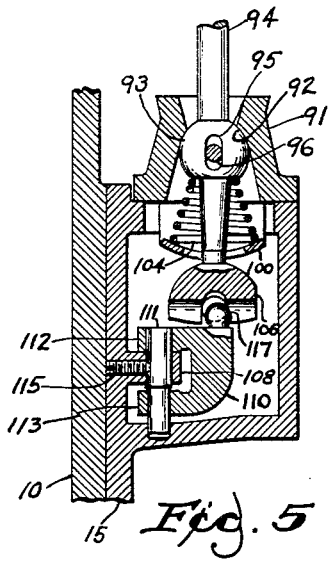
Figure 5 is an elevational view taken on lines 5—5 of Figure 1.
Figure 6:
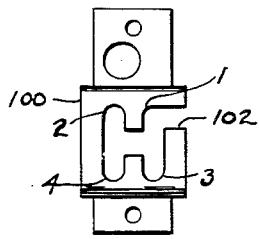
Figure 6 is a bottom view of the guide, shown in Figure 2, for the shift lever.
Figure 7:
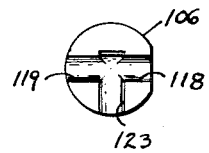
Figure 7 is a bottom view of the shifting cap at the lower end of the shift lever.

Splined to shaft 12 is the shifter collar 60 which is slidable axially on shaft 12 and has an annular flange 61 spaced radially from the shaft 12 which has an internal clutch portion 63 and an external clutch portion 64 cut thereon for engagement with the clutch portions 30 and 39 respectively. A shifting yoke 66 engages the collar 60 and is slidable on supporting shaft 68 to cause the collar 60 to lock either clutch portion 30 or 39 with the shaft 12 as desired. It will be noted that very little axial displacement of the collar 60 is required to move it from one extreme position to the other. The shifting collar 66 has a horizontally disposed arm 69 (Fig. 2) which is round in cross section for purposes referred to hereinafter. Another shifting collar 71 is slidably mounted, by means of a spline connection, on a reduced portion of shaft 13 and comprises a hub portion 72 having an external clutch portion 73 on the periphery thereof, which, depending on the location of the shifting yoke 75, engages with either clutch portion 47 or 57 to lock gear 44 or cluster 51 respectively to the shaft 13. Shifting yoke 75 is slidably mounted on the supporting shaft 76 and has three detents 78, 79 and 80 on the upper side of its bearing portion 81. A hardened ball 82 is adapted to engage with either of the detents 78, 79, or 80 to hold the shifting collar 71 in engagement with cluster 51, a neutral position or in engagement with gear 44 respectively. In this respect it will be noted that the single ball serves to hold the shift lever in any of its positions and such a locking device is not required on the shifting yoke 66 for reasons which will become more apparent as this disclosure progresses. The ball 82 is spring loaded to hold it firmly against the selected detent by means of a spring 83, the compression of which is adjustable by means of the easily accessible adjusting screw 85. The spring 83 and adjusting screw 85 are contained within the sleeve 86 which is press fitted into the cover 87 of the housing 15. On the lower portion of the shifting yoke 75 is a lug 89 having a slotted recess 90 for purposes presently to be described. The cover plate 87 has a raised portion 91 having a spherically shaped seat 92 which receives a spherical portion 93 of the shifting lever 94. A slot 95, best shown in Fig. 5, extends through the spherical portion 93 and the pin 96 extends therethrough and is seated in apertures in either side of the raised portion 91. Thus the lever 94 is free to move in any direction, within limits, relative to the raised portion 91. A guide plate 100 (best shown in Figs. 3 and 6) is secured by means of bolts to the cover plate 87 and has an H shifting pattern with recesses 1, 2, 3 and 4 which correspond to the positions, shown in Fig. 3, of the upper end of the shift lever. A slot 102 is provided in the guide 100 for assembly purposes. The lower end of the conical compression spring 104, which surrounds the shift lever 94, is seated against the guide plate 100 and the upper end bears against the spherical portion 93 holding it firmly against the spherical surface 92 of raised portion 91. At the lower end of lever 94 is secured a shifting cap 106 having a T-shaped slot therein (best shown in Figure 7). Extending from and integral with the inner central portion of housing 15 is a lug 108 having an aperture extending vertically therethrough. A bell crank 110 is pivotally mounted on lug 108 by means of pin 111 which extends through the aperture in lug 108. A set screw 115 holds the pin firmly in place. On the upper surface of the bell crank 110 and offset from the pin 111 is a spherical knob 117 integral therewith. The knob 117 is adapted to be snugly received by either arm portions 118 or 119 of the T-shaped slot in cap 106. In this respect the knob bears against either side of arm portions 118, 119 of the T slot at all times allowing no play or looseness of this connection. It will be noted from Figure 5 that this T slot is of considerable depth in order that contact is maintained between the knob 117 and the walls of the T slot regardless of the arcuate movement of the cap 106 when the lever 94 is shifted. The bell crank 110 has an arm 121 disposed at approximately right angles to the direction in which the knob 117 is offset from the pivotal connection of the bell crank member. The arm 121 has a circular surface at its outer end which engages with the slot 90 in lug 89 of the shifting collar 75 previously described. The circular portion of arm 121 remains in contact with the slot 90 at all times regardless of its arcuate movement, thereby affording no looseness. The arm 69 of the other shifting yoke 66 is received by the leg slot portion 123 (Fig. 7) of cap 106.

The transmission as shown in the figures is in the neutral position, neither the shifting collar 60 nor 71 being in engagement with a gear. Assuming the operator wishes to put the transmission in the number 1 position, he would first move the upper end of lever 94 inwardly of the tractor frame and into the position shown by letter A in Figure 3. By this initial movement he has selected what we term the "low range" and has thus caused the shifting yoke 66 to be moved outwardly on shaft 68 carrying with it shifting collar 60 thereby meshing clutch portions 64 and 39. During this initial shifting of yoke 66 no movement of the other yoke 75 takes place as the arm portion 118 of the slot simply slides over knob 117. Then by shifting the upper end of the lever 94 into the position 1 (Figure 3) the bell crank 110 is caused to move in a clockwise direction, thereby shifting yoke 75 in an inwardly direction, engaging the clutch portions 73 and 47. The train of power is then through shaft 12, collar 60, gear 35, cluster 51, gear 44, collar 71 and out through shaft 13.

When the shifting lever is moved from neutral to position 2 (Fig. 3) the collar 60 will first be shifted inwardly and meshed with cluster 25, during the second part of the movement of lever 94 bell crank 110 will be swung in a clockwise direction causing collar 71 to mesh with gear 44 which receives its power from the gear element 27 of cluster 35.

When the number three position of the shifting lever 94 is selected the collar 60 will first be engaged with clutch portion 37 of gear 35, or the "A" range, and when the operator moves the lever rearwardly into its final position, the bell crank 110 will be rotated in a counterclockwise direction, because knob 117 is in arm slot 119, which will engage clutch portions 73 of collar 71 with 57 of cluster 51. In this event the gear element 54 of the cluster 51 receives the power from gear 35. When the lever 94 is moved to the number four position from neutral, the "B" range is selected first which moves the collar 60 into engagement with cluster 25 and then rearward movement of the control lever 94 into position 4 will cause the bell crank to rotate in a counterclockwise direction which engages collar 71 with the cluster 51, the power being delivered from gear element 28 through gear element 53.

It will now be evident that when the shifting lever is in the neutral position shown in Figure 1, it is necessary that the operator select either range A or B (move the lever in a transverse direction), before the shifting collar 71 is moved due to the shape of the guide member 190 (Fig. 6) which permits the lever to be moved into either number 1, 2, 3, or 4 positions only after this transverse movement.

It will now be seen that we have provided a very compact and efficient serpentine transmission which employs an endwise shift for each of two separate sets of gears having a common shifting member utilizing a conventional H shift pattern which precludes the incorrect sequence of gear selection. Due to the particular means for connecting the lower end of the shifting lever to the shifting yokes of the two shafts, it is necessary only to have a single locking means for holding the yokes in the selected positions.

Having thus shown and described our invention, we claim:

1. In a gear shift mechanism the combination comprising; a housing having a side wall; an outwardly extending housing secured to said side wall; a pair of spaced parallel shafts extending through said wall and into said outwardly extending housing; a shifting collar slidably mounted on each of said shafts and located within said extending housing; a common shifting means for sequentially shifting said collars comprising, a shift lever universally mounted intermediate its length on said extending housing and having a cap at the lower end thereof with a T slot therein comprising a leg and arm portions, a yoke for one of said collars having an arm adapted to be engaged by the leg portion of said slot, a two-arm bell crank pivotally mounted within said extending housing and between said collars, a knob on one arm of said bell crank adapted to be received in the arm portions of said slot, a second yoke for said other collar adapted to be engaged by the other arm of said bell crank, a guide plate fixed within said extending housing and having an H-shaped slot through which said lever extends.

2. In a shifting mechanism for a transmission having a pair of spaced parallel shafts mounted within a housing, the combination comprising; a shifting collar on each of said shafts, a shifting yoke for each of said collars, a gear shift lever comprising a cap on the lower end thereof having a T slot therein with leg and arm portions, one of said yokes having an arm adapted to be received by said leg portion, a two-arm bell crank pivotally mounted within said housing having a knob on one of its arms which is adapted to be received by said arm portions, the other arm of said crank engaging said other yoke for shifting thereof, guide means for said lever whereby the shifting sequence of said yokes is determined.

3. A common shifting means for sequentially shifting a pair of collars which are slidably mounted on a pair of spaced parallel shafts within a supporting housing, the improvement comprising; a shift lever universally mounted intermediate its length on said housing and having a cap on the lower end thereof with a T slot therein comprising a leg and arm portions, a yoke for one of said collars having an arm adapted to be engaged by the leg portion of said slot, a two-arm bell crank pivotally mounted within said housing, a knob on one arm of said crank adapted to be received by said arm portions, a second yoke for said other collar engaged by the other arm of said crank, a guide plate fixed to said housing having an H-shaped slot through which said lever extends.

No references cited.